(12) United States Patent
Shimoda et al.

(10) Patent No.: US 11,135,518 B2
(45) Date of Patent: Oct. 5, 2021

(54) PROGRAM, CONTROL METHOD, AND INFORMATION PROCESSING APPARATUS

(71) Applicant: GREE, Inc., Tokyo (JP)

(72) Inventors: Shota Shimoda, Tokyo (JP); Shinji Watanabe, Tokyo (JP); Keiko Sakurai, Tokyo (JP)

(73) Assignee: GREE, Inc., Tokyo (JP)

( * ) Notice: Subject to any disclaimer, the term of this patent is extended or adjusted under 35 U.S.C. 154(b) by 40 days.

(21) Appl. No.: 16/415,290

(22) Filed: May 17, 2019

(65) Prior Publication Data

US 2019/0270017 A1     Sep. 5, 2019

Related U.S. Application Data

(63) Continuation of application No. 15/191,700, filed on Jun. 24, 2016, now Pat. No. 10,335,686.

(30) Foreign Application Priority Data

Jun. 30, 2015   (JP) .................................. 2015-131645
Sep. 28, 2015   (JP) .................................. 2015-190455
May 16, 2016   (JP) .................................. 2016-098046

(51) Int. Cl.
    *A63F 13/58*         (2014.01)
    *A63F 13/69*         (2014.01)
    (Continued)

(52) U.S. Cl.
    CPC .............. *A63F 13/69* (2014.09); *A63F 13/58* (2014.09); *A63F 13/67* (2014.09); *A63F 13/48* (2014.09)

(58) Field of Classification Search
    CPC ................................. A63F 13/57; A63F 13/69
    See application file for complete search history.

(56) References Cited

U.S. PATENT DOCUMENTS 6,210,273 B1 *    4/2001    Matsuno ................. A63F 13/10
                                                       463/8
6,270,416 B1      8/2001    Komoto
                        (Continued)

FOREIGN PATENT DOCUMENTS

JP          2014-233421 A      12/2014

OTHER PUBLICATIONS

Touchgameplay, Galaxy Dash: Race to the Outer Run-iOS / Android— HD (Sneak Peek) Gameplay Trailer; avaialable at https://www.youtube.com/watch?v=oo1kUlzZa2k; first published Aug. 13, 2014; last accessed Nov. 21, 2020. (Year: 2014).*

(Continued)

*Primary Examiner* — Jay Trent Liddle
(74) *Attorney, Agent, or Firm* — Maier & Maier, PLLC

(57) ABSTRACT

A program that may cause an information processing apparatus that executes a game to execute: storing, in a storage unit, a first parameter associated with a first game content arranged in virtual space and a second parameter associated with a second game content arranged in the virtual space; starting a match between the first game content and the second game content; automatically changing a third parameter regarding a positional relationship between the first game content and the second game content in the virtual space to be closer to a first target value at a certain time change rate; changing the second parameter associated with the second game content, on the basis of the third parameter and the first parameter associated with the first game content; and determining that a user wins the match when the second parameter becomes a second target value.

14 Claims, 9 Drawing Sheets

(51) Int. Cl.
  *A63F 13/67* (2014.01)
  *A63F 13/48* (2014.01)

(56) References Cited

U.S. PATENT DOCUMENTS

| | | | | |
|---|---|---|---|---|
| 6,283,861 | B1* | 9/2001 | Kawai | A63F 13/10 |
| | | | | 463/43 |
| 2002/0072409 | A1* | 6/2002 | Nishizawa | A63F 13/02 |
| | | | | 463/36 |
| 2005/0170888 | A1 | 8/2005 | Sakamoto | |
| 2007/0032280 | A1 | 2/2007 | Itskov | |
| 2007/0149266 | A1 | 6/2007 | Arakawa | |
| 2007/0167203 | A1* | 7/2007 | Yamada | A63F 13/10 |
| | | | | 463/7 |
| 2009/0305758 | A1* | 12/2009 | Nomura | A63F 13/822 |
| | | | | 463/7 |
| 2012/0015726 | A1 | 1/2012 | Busey | |
| 2013/0244740 | A1 | 9/2013 | Shimamura | |
| 2013/0288794 | A1 | 10/2013 | Ando | |
| 2013/0316819 | A1 | 11/2013 | Kinashi | |
| 2013/0337906 | A1 | 12/2013 | Ikeda | |
| 2014/0256428 | A1 | 9/2014 | Nakatsu | |
| 2014/0323224 | A1 | 10/2014 | Sasaki | |
| 2015/0080123 | A1 | 3/2015 | Motokura | |
| 2015/0258442 | A1* | 9/2015 | Yudo | A63F 13/58 |
| | | | | 463/31 |
| 2017/0001121 | A1* | 1/2017 | Shimoda | A63F 13/67 |

OTHER PUBLICATIONS

Japanese Office Action dated Jul. 28, 2015 in corresponding Japanese Application No. 2015-131645; 6 pgs.
"Crystal Fantasia", URL: http://game.boom-app.com/entry/crystalfantasia-review, Published Nov. 20, 2014, Accessed Jun. 22, 2016; 17 pgs.
Japanese Office Action dated Oct. 27, 2015 in corresponding Japanese Application No. 2015-190455; 8 pgs.
"Tokiden", Weekly Famitsu, KK Enterbrain, Published Jun. 27, 2013, No. 28; 18 pgs.
Japanese Office Action dated Feb. 23, 2016 in corresponding Japanese Application No. 2015-190455; 7 pgs.
"Hunter of PECO diary", URL: http://monsterhunterpeco.blog39.fc2.com/blog-entry-723.html, Published Jun. 27, 2010, Accessed Jun. 22, 2016; 9 pgs.
高速RPG- 水晶幻想曲（Crystal Fantasia/ クリスタルフ ァンタジア）, URL: https://www.youtube.com/watch?v-bfrAIesKsIY,available at published on Nov. 16, 2014, last accessed Feb. 15, 2018.

* cited by examiner

FIG. 2

| USER ID | INFORMATION REGARDING FIRST GAME MEDIUM | DECK INFORMATION | POINTS |
|---|---|---|---|
| user001 | **** | **** | **** |
| user002 | **** | **** | **** |
| user003 | **** | **** | **** |
| ... | ... | ... | ... |

FIG. 3

| GAME PART ID | GAME PART NAME | DIFFICULTY LEVEL | POINTS TO BE CONSUMED | INFORMATION REGARDING STAGE | INFORMATION REGARDING SECOND GAME MEDIUM |
|---|---|---|---|---|---|
| P001 | **** | **** | **** | **** | **** |
| P002 | **** | **** | **** | **** | **** |
| P003 | **** | **** | **** | **** | **** |
| ... | ... | ... | ... | ... | ... |

| RELATIVE DISTANCE d | STAGE CONFIGURATION |
|---|---|
| $d_3 < d \leq d_4$ | |
| $d_1 < d \leq d_3$ | A |
| $d_0 < d \leq d_1$ | |
| $d = d_0$ | B |

| OPPONENT CHARACTER ID | HP | RELATIVE DISTANCE d | ATTACK ABILITY | OPERATION FORMAT | IMAGE |
|---|---|---|---|---|---|
| E001 | **** | $d_3 < d \leq d_4$ | 10 | P | pic001 |
| | | $d_1 < d \leq d_3$ | 50 | | |
| | | $d_0 < d \leq d_1$ | 100 | Q | |
| | | $d = d_0$ | 200 | R | pic002 |

$d = d_2$ $d = d_1$ $d = d_0$

PROGRAM, CONTROL METHOD, AND INFORMATION PROCESSING APPARATUS

PRIORITY

This application is a continuation of and claims priority to U.S. application Ser. No. 15/191,700, filed Jun. 24, 2016, and entitled "PROGRAM, CONTROL METHOD, AND INFORMATION PROCESSING APPARATUS", the disclosures of which are incorporated herein by reference.

FIELD

The present invention relates to a program, a control method, and an information processing apparatus.

BACKGROUND

In known match games, a user's character plays a match with an opponent character in response to a user input performed on an information processing apparatus such as a smart phone. For example, Japanese Unexamined Patent Application Publication No. 2014-233421 discloses a match game where a user solves a puzzle in a puzzle section at the bottom of a game screen, and, in accordance with that result, the user's character attacks an opponent character in a match screen section at the top of the game screen.

In such known match games, a match between a user's character and an opponent character may not develop with sufficient changes in accordance with the progress of the game. For example, the result of playing the puzzle game is merely used in determining a condition for the user's character to attack the opponent character, and does not contribute to changes in the development of the game. Therefore, the development of the game from the beginning to the end does not change significantly, which may make the game monotonous for a user. There is room for improvement in realizing a game that does have a changing development.

SUMMARY

Accordingly, exemplary embodiments described herein may provide a program, a control method, and an information processing apparatus for realizing a game that changes the development of the game in accordance with the progress of the game.

According to an exemplary embodiment, there may be provided a program that causes an information processing apparatus that executes a game to execute: a storing step of storing, in a storage unit, a first parameter associated with a first game content arranged in virtual space and a second parameter associated with a second game medium arranged in the virtual space; a starting step of starting a match between the first game medium and the second game content; a first changing step of automatically changing a third parameter regarding a positional relationship between the first game content and the second game content in the virtual space to be closer to a first target value at a certain time change rate; a second changing step of changing the second parameter associated with the second game content, on the basis of the third parameter and the first parameter associated with the first game content; and a determining step of determining that a user wins the match when the second parameter becomes a second target value.

According to an exemplary embodiment, in the second changing step, an amount of change in the second parameter may be greatest when the third parameter is equal to the first target value.

According to an exemplary embodiment, in the second changing step, an amount of change in the second parameter may increase as the third parameter becomes closer to the first target value.

According to an exemplary embodiment, in the storing step, there may be stored, in the storage unit, attribute information indicating an attribute of the first game content, and information that indicates a corresponding relationship between an attribute and the third parameter. According to an exemplary embodiment, in the changing step, an amount of change in the second parameter may increase when an attribute corresponding to the third parameter and the attribute of the first game content have a certain corresponding relationship.

According to an exemplary embodiment, the program may further cause the information processing apparatus to execute a step of switching information regarding the second game content in accordance with the third parameter.

According to an exemplary embodiment, the information regarding the second game content may include at least one of an image of the second game content on a screen, and an operation format of the second game content in the match.

According to an exemplary embodiment, the program may further cause the information processing apparatus to execute a step of increasing a fourth parameter when a first task is successfully achieved. According to an exemplary embodiment, in the second changing step, the second parameter may be changed on the basis of the third parameter, the first parameter, and the fourth parameter.

According to an exemplary embodiment, the time change rate of the third parameter may be determined in accordance with the fourth parameter.

According to an exemplary embodiment, the program may further cause the information processing apparatus to execute a third changing step of changing the third parameter to be away from the first target value when the second task is not achieved.

According to an exemplary embodiment, in the third changing step, the third parameter may be changed to belong to another range different from a range to which the third parameter currently belongs, among a plurality of non-overlapping numerical ranges.

According to another exemplary embodiment, there may be provided a control method for an information processing apparatus that executes a game. The control method may include: a storing step of storing, in a storage unit, a first parameter associated with a first game content arranged in virtual space and a second parameter associated with a second game content arranged in the virtual space; a starting step of starting a match between the first game content and the second game content; a first changing step of automatically changing a third parameter regarding a positional relationship between the first game content and the second game content in the virtual space to be closer to a first target value at a certain time change rate; a second changing step of changing the second parameter associated with the second game content, on the basis of the third parameter and the first parameter associated with the first game content; and a determining step of determining that a user wins the match when the second parameter becomes a second target value.

According to yet another exemplary embodiment, there may be provided an information processing apparatus including a storage unit that stores a first parameter associated with a first game content arranged in virtual space and a second parameter associated with a second game content arranged in the virtual space; and a control unit. The control unit may start a match between the first game content and the second game content; may automatically change a third parameter regarding a positional relationship between the first game content and the second game content in the virtual space to be closer to a first target value at a certain time change rate; may change the second parameter associated with the second game content, on the basis of the third parameter and the first parameter associated with the first game content; and may determine that a user wins the match when the second parameter becomes a second target value.

Therefore, according to some exemplary embodiments of the program, the control method, and the information processing apparatus, a game that changes how it develops in accordance with the progress of the game is realized.

BRIEF DESCRIPTION OF THE DRAWINGS

Exemplary

Exemplary FIG. 2 is a diagram illustrating information stored by a server storage unit.

Exemplary FIG. 3 is a diagram illustrating information stored by the server storage unit.

Exemplary

Exemplary

Exemplary

Exemplary

Exemplary

Exemplary

Exemplary

Exemplary

Exemplary

DETAILED DESCRIPTION

Hereinafter, exemplary embodiments of a program, control method, and information processing apparatus will be described.

Figure 1:
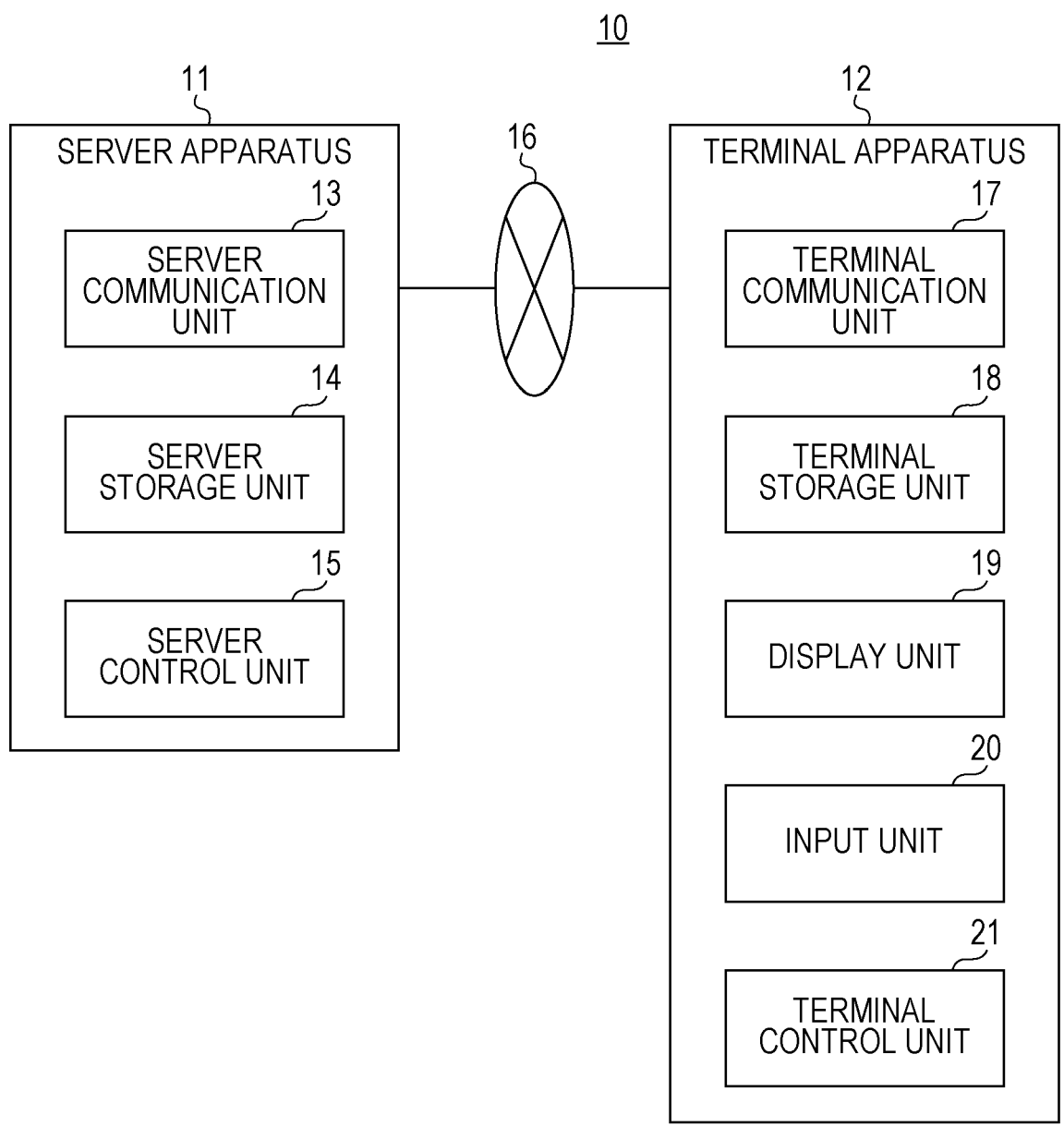
FIG. 1 is a block diagram of a game system according to an embodiment of the present invention.

First, an exemplary embodiment of a game system including a server apparatus and a terminal apparatus will be described. Referring to FIG. 1, a game system 10 according to the embodiment may include a server apparatus 11 and a plurality of terminal apparatuses 12. FIG. 1 illustrates only one terminal apparatus 12 for the sake of simplification. The server apparatus 11 provides a game to the terminal apparatus 12 owned by each user.

Now, the outline of the game according to the embodiment will be described. In the game according to the embodiment, a user may use a game content to play a match with a game content serving as an opponent. A game content may be electronic data used in the game and may include, for example, a card, an item, a character, an avatar, and an arbitrary medium. A game content may be electronic data that may be obtained, owned, used, managed, exchanged, combined, strengthened, sold, discarded, or given by a user in the game. The usage formats of a game content are not limited to those described in this specification.

Hereinafter, unless otherwise noted, "a game content owned by a user" refers to a game content associated with a user. In addition, "giving a game content to a user" refers to associating a game content with a user. In addition, "a user discards a game content owned by the user" refers to cancelling the association between a game content and a user.

In the game according to the embodiment, a user may play a part of the game including a match game, which may be referred to as a desired match game part, among a plurality of match game parts. The match game part may be a game part in which, out of the game executed on the terminal apparatus 12 of the user, the user plays a match with a game content serving as an opponent. The match game part may be, for example, a certain quest or mini game executable within the game, but is not limited to these types. In the match game part, the user may use one, some, or all of one or more game media (first game media) owned by the user, which may be one or more characters in the present embodiment (hereinafter may also be referred to as a "deck") to play a match with a second game content, which may be an opponent character such as a non-player character (NPC) in the present embodiment.

Each character used in the match game part, namely, each character included in the deck, may be associated with parameters such as health measured in hit points (HP), attack ability, level, skill, and attribute. The HP of a character may be a parameter that decreases when the character is attacked by the opponent character, for example. When the HP of the character reaches zero, the user may lose in the match with the opponent character. The attack ability of a character may be a parameter that contributes to the amount of decrease in the HP of the opponent character (hereinafter may also be referred to as "damage") when the character attacks the opponent character. According to an exemplary embodiment, a character having a higher attack ability may cause greater damage to an opponent character with one attack. The level of a character may be a parameter that indicates the degree of growth of the character. As the level becomes higher, the HP and the attack ability may also become higher, for example. The skill of a character may be information that indicates a character-specific effect demonstrated by the character during the gameplay of a game part. Exemplary skills may include a skill that has the effect of increasing a parameter such as the HP or attack ability of a character in the deck, and a skill that has the effect of decreasing damage caused by an attack made by an opponent character, but are not limited to these examples. The attribute of a character may be a parameter that indicates at least one of attributes including fire, tree, and water, for example. The attribute of a character may be information that indicates a superior-inferior relationship between characters. For example, a character with the fire attribute may make an attack that causes greater damage to a character with the tree attribute, but may make an attack that causes less damage to a character with the water attribute. The attributes are not limited to fire, tree, and water, and may include a long-ranged type, a mid-ranged type, and a short-ranged type, for example.

The match game part may be, for example, a horizontal-scrolling action game. The user may operate a moving object such as a bike to obtain certain items (attack items) while avoiding obstacles. A character included in the deck may attacks the opponent character in accordance with the number of attack items obtained. When the HP of the opponent character decreases to zero as a result of one or more attacks made by the user's character, the user may win the match. In contrast, when the total HP of the user's character(s) decreases to zero as a result of an attack made by the opponent character, or when the HP of the opponent character does not decrease to zero within a certain limit time, the user may lose the match. The outcome or the result of the match may thus be determined, and the game part may end.

The amount of decrease in the HP of the opponent character as a result of an attack made by the user's character may be determined by a third parameter regarding the positional relationship between the moving object and the opponent character arranged in virtual space. In the present embodiment, the third parameter may be a relative distance d that indicates the distance between the moving object and the opponent character in virtual space where the moving object and the opponent character are arranged. For example, if the relative distance d becomes greater (that is, when the moving object and the opponent character become more distant from each other), the amount of decrease in the HP of the opponent character as a result of an attack made by the user's character may be lessened. In contrast, if the relative distance d becomes less (that is, when the moving object and the opponent character become closer to each other), the amount of decrease in the HP of the opponent character as a result of an attack made by the user's character may be heightened.

In the present embodiment, the relative distance d may be automatically changed by automatically moving the moving object in the virtual space, for example. The game circumstances, such as the amount of decrease in the HP of the opponent character as a result of an attack made by the user's character, may change in accordance with the progress of the game.

The match game part is not limited to the above-described action game. Games of arbitrary genres, such as a puzzle game, a quiz game, or a fighting game, may be played.

The user who wins the match may be rewarded a certain game content. In the present embodiment, exemplary certain game media may include a character, a character or an item used for strengthening a character (such as increasing the level of a character), and one or more points (such as in-game currency) necessary for increasing the level of a character. In the game according to the present embodiment, one of the user's purposes may be to make characters owned by the user more various or to increase the level of each character by repeatedly performing asynchronous matches and acquiring rewards.

Next, the elements of the game system 10 will be described. The server apparatus 11 may include a server communication unit 13, a server storage unit 14, and a server control unit 15.

The server communication unit 13 may be an interface for communicating wirelessly or via wire with an external apparatus and exchanging information. The server communication unit 13 may exchange information with the terminal apparatus 12 via a network 16 such as the Internet.

The server storage unit 14 may store various types of information and programs necessary for providing and controlling the game.

For example, the server storage unit 14 may store information regarding each of users. Information regarding each user may include information regarding a first game content, deck information, and points, which may be associated with a user ID, as illustrated in FIG. 2.

A user ID may be an identifier capable of uniquely identifying each of a plurality of users.

Information regarding a first game content may be information regarding a game content (a first game content) owned by a user, namely, a character in the present embodiment. A game content owned by a user may refer to a game content stored in association with a user ID in the server storage unit 14. Information regarding a first game content may include, for each character, the identifier of the character, the name of the character, or the character's HP, attack ability (first parameter), level, skill, and attribute, for example. An item for changing a parameter of a character, such as a game content of another type including a weapon or protective equipment, may be associated with the character. A game content such as a character or an item displayed in the game may be displayed in an arbitrary form in the game, such as in the form of a card representing a character or an item.

Deck information may include information regarding one, some, or all of one or more characters (deck), among one or more characters owned by a user, namely, one or more characters included in information regarding first game media. According to an exemplary embodiment, the number of characters included in the deck may be arbitrarily defined. One or more characters included in the deck may be used for playing a match game part, as has been described above. For example, deck information may include parameters such as the HP, attack ability, level, skill, and attribute of each character included in the deck.

Points may be a parameter that increase as time passes or as the user uses a certain game content, for example. When the user selects a match game part, a number of points, this number being indicated by an indication of points consumed corresponding to the selected match game part may be consumed, and the game part begins, as will be described later. If the user's points are less than the number of points indicated by the indication of points consumed, the game part may not begin.

The server storage unit 14 may store information regarding a game part. Information regarding a game part may include a game part name, difficulty level, points consumed, information regarding a stage, and information regarding a second game content, which may be associated with a game part ID, as illustrated in FIG. 3.

A game part ID may be an identifier capable of uniquely identifying each of match game parts.

A game part name may be the name of a match game part (such as the name of a quest) identifiable by a user.

A difficulty level may be a parameter that indicates the difficulty level of a match game part.

The indication of points consumed may be information that indicates the number of points necessary for a user to start a match game part. These points may, for example, increase as time passes, and may be associated with each user, as has been described above. A user may select a match game part, a quantity of points whose number is indicated by an indication of points consumed corresponding to the selected match game part may be consumed, and the match game part may begin.

Information regarding a stage may include various types of information necessary for configuring a stage used in the progress of a match game part. In the present embodiment, examples of information regarding a stage may include information that indicates the shape and location of a course where a moving object can travel in a horizontal-scrolling action game, and information (stage configuration) that indicates the location of attack items, obstacles, and later-described acceleration items. However, the details of information regarding a stage are not limited to the above examples. For example, in another embodiment where a competitive action game is played in which a character freely movable on a game field plays a match with an opponent character in a match game part, information regarding a stage may include information that indicates the shape of the game field and information that indicates objects (such as walls, buildings, and trees) located on the game field. Alternatively, in another embodiment where a competitive race game is played in which a character and an opponent character travel on a course in a match game part, information regarding a stage may include information that indicates the shape of the course.

Figures 4, 5:
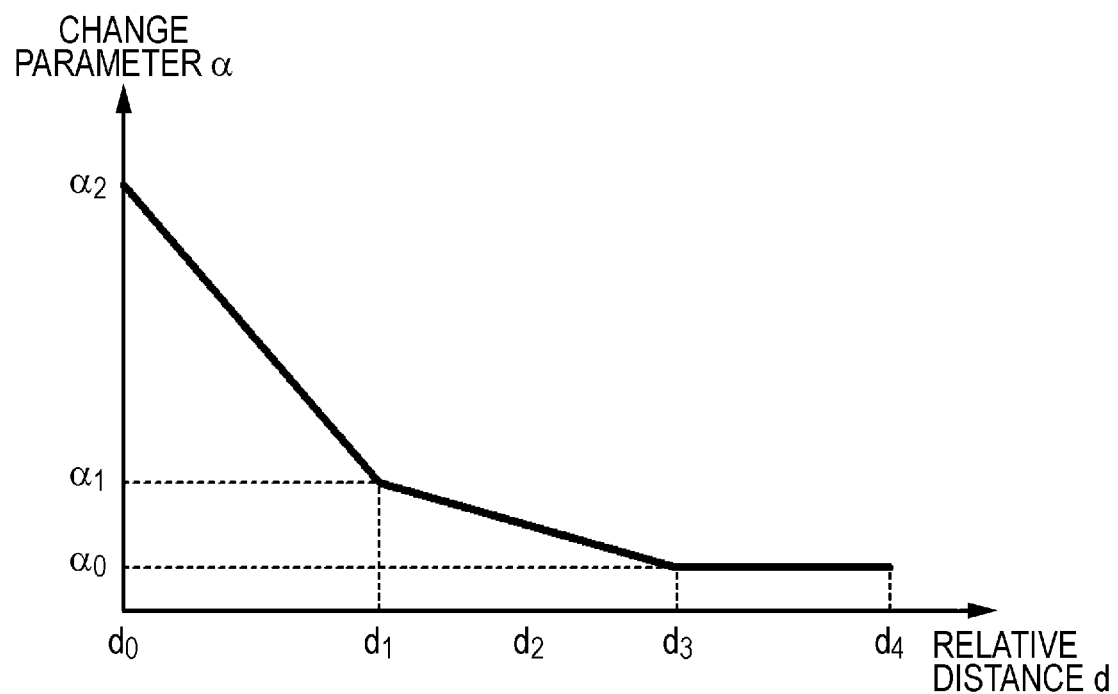
FIG. 4 is a diagram illustrating information stored by the server storage unit.
FIG. 5 is a diagram illustrating the corresponding relationship between a relative distance d and a change parameter α.

According to an exemplary embodiment, information regarding a stage may include a stage configuration in association with the range or value of the relative distance d. For example, as illustrated in FIG. 4, given $d_0=0$ and $d_0<d_1<d_2<d_3<d_4$, different stage configurations may be associated with the range $d_0<d\leq d_4$ and the range $d=d_0$. Therefore, the stage configuration (the shape and location of a course, for example) in a match game part may be switched in accordance with the relative distance d. For example, the difficulty level of stage configuration A corresponding to the range $d_0<d\leq d_4$ may be higher than the difficulty level of stage configuration B corresponding to the relative distance $d=d_0$.

In the present embodiment, information regarding a stage may include information that indicates the corresponding relationship between the relative distance d and a change parameter $\alpha$. The change parameter $\alpha$ may be a parameter that changes the amount of change (decrease) in the HP of the opponent character as a result of an attack made by the user's character, as will be described later. In the present embodiment, the change parameter $\alpha$ may change within the range of $\alpha_0$ (such as $\alpha_0=0.1$)$\leq\alpha\leq\alpha_2$ (such as $\alpha_2=1.0$). The change parameter $\alpha$ may be multiplied with the attack ability of the user's character, or with the amount of change calculated on the basis of the attack ability of the user's character. Alternatively, the change parameter $\alpha$ may be added to the attack ability of the user's character, or to the amount of change calculated on the basis of the attack ability of the user's character. A greater value of the change parameter $\alpha$ may thus, according to some embodiments, cause a greater amount of decrease in the HP of the opponent character as a result of an attack made by the user's character.

FIG. 5 is a graph illustrating an exemplary corresponding relationship between the relative distance d and the change parameter $\alpha$. In this graph, the relative distance d is plotted on the horizontal axis, and the change parameter $\alpha$ is plotted on the vertical axis. In the present embodiment, given $\alpha_0<\alpha_1<\alpha_2$, for example, the change parameter $\alpha$ may be $\alpha_0$ ($\alpha=\alpha_0$) in the range $d_3<d\leq d_4$. As the relative distance d decreases from $d_3$, the change parameter $\alpha$ may change (increase) at a first change rate, and the change parameter $\alpha$ may become $\alpha_1$ ($\alpha=\alpha_1$) when d is $d_1$ ($d=d_1$). As the relative distance d decreases from $d_1$, the change parameter $\alpha$ may change (increase) at a second change rate, which may be greater than the first change rate, and the change parameter $\alpha$ may become $\alpha_2$ ($\alpha=\alpha_2$) when d is $d_0$ ($d=d_0$). According to an exemplary embodiment, as has been described above, the possible range of the relative distance d ($d_0\leq d\leq d_4$) may be divided into a plurality of numerical ranges ($d_0\leq d\leq d_1$, $d_1<d\leq d_3$, and $d_3<d\leq d_4$), and the change rate of the change parameter $\alpha$ may be defined to be different in these numerical ranges. Alternatively, information that indicates the corresponding relationship between the relative distance d and the change parameter $\alpha$ may be described by a desired formula, or may be described as a look-up table.

Information regarding a second game content (see FIG. 3) may be information regarding a game content (second game content) with whom the user plays a match in the match game part, namely, the opponent character in the present embodiment. Information regarding a second game content may include, for example, the opponent character's identifier, name, HP, attack ability, level, skill, and/or attribute.

Figures 6, 7:
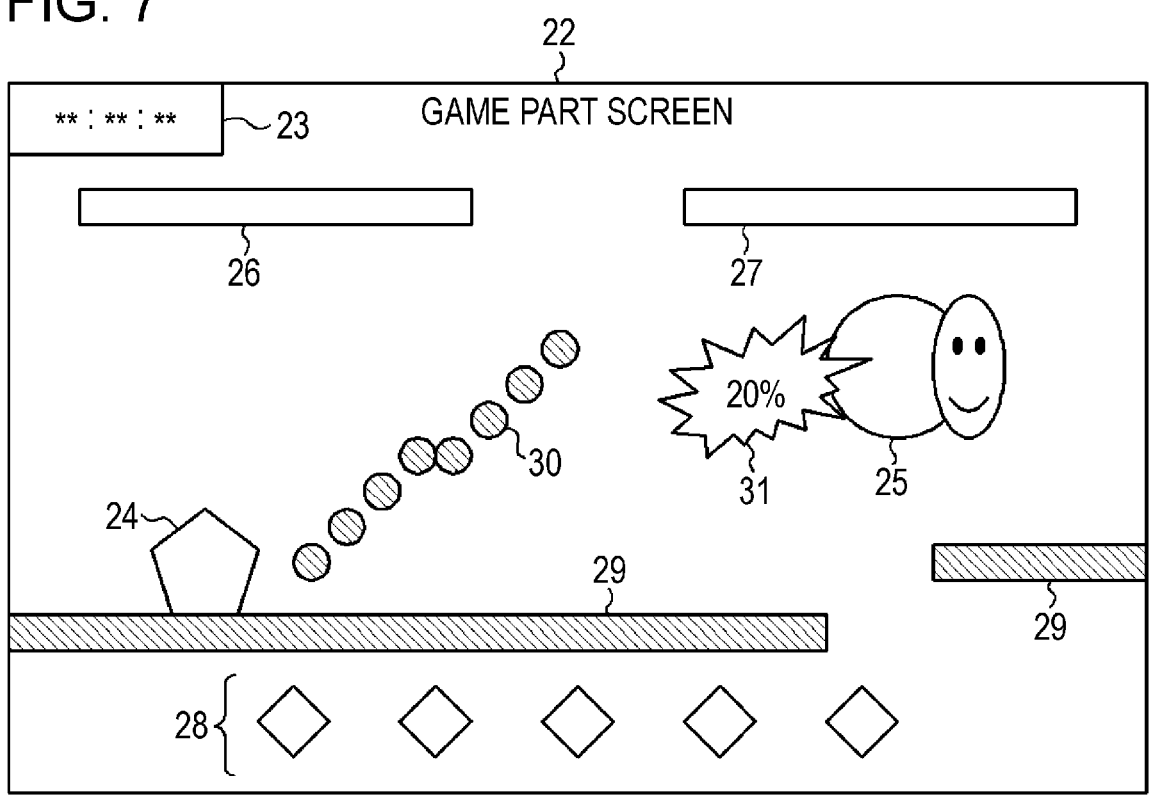
FIG. 6 is a diagram illustrating information stored by the server storage unit.
FIG. 7 is a diagram illustrating a screen displayed on a terminal apparatus illustrated in FIG. 1.

According to an exemplary embodiment, information regarding a second game content may include, for example, as illustrated in FIG. 6, the HP (second parameter) and the relative distance d in association with each opponent character ID. Information regarding a second game content may further include the attack ability, operation format, and image in association with the range or value of the relative distance d.

According to an exemplary embodiment, an opponent character's identifier (ID) may be an identifier capable of uniquely identifying each opponent character.

An HP value may be a parameter that indicates the HP of an opponent character. As has been described above, when the HP of the opponent character decreases to zero, the user may win. In contrast, when the total HP of the user's character(s) included in the user's deck decreases to zero before the HP of the opponent character decreases to zero, the user may lose.

The relative distance d may indicate the range or value of the virtual distance d between the user's character and the opponent character who are playing a match with each other.

An attack ability may be a parameter that indicates the attack ability of an opponent character. As has been described above, the greater the attack ability of the opponent character, the greater the amount of decrease in the total HP of the user's character(s) as a result of an attack made by the opponent character. For example, according to one exemplary embodiment, the attack ability of an opponent character may increase in the following order: $d_3<d\leq d_4$ (attack ability=10), $d_1<d\leq d_3$ (attack ability=50), $d_0<d\leq d_1$ (attack ability=100), and $d=d_0$ (attack ability=200). According to an exemplary embodiment, the attack ability of the opponent character may vary inversely with the relative distance d.

An operation format may be information that indicates the operation format of an opponent character, such as an attack method, an attack frequency, and usable skills. For example, according to an exemplary embodiment, different operation formats may be associated with different ranges of the relative distance d, namely, $d_1<d\leq d_4$, $d_0<d\leq d_1$, and $d=d_0$. Therefore, the operation format of the opponent character in the match game part may be switched in accordance with the relative distance d. For example, according to an exemplary embodiment, the operation format of the opponent character is varied in the following order: an operation format P may be associated with $d_1<d\leq d_4$, an operation format Q may be associated with $d_0<d\leq d_1$, and an operation format R may be associated with $d=d_0$. The progression of operation format from P to Q to R may be a strengthening of the operation format of an opponent character. The operation format being strengthened may include the operation format changing so as to increase the difficulty level of winning against the opponent character; for example, it may change the attack method of the opponent character to make it more effective, may cause an increase in the attack frequency, or may cause different behavior in the use of skills. According to an exemplary embodiment, the movement direction and the movement speed of the opponent character in virtual space may be different in accordance with the operation format. For example, the opponent character may stop or move closer to or away from the moving object in accordance with the operation format.

An image may be an image that is displayed on a later-described game part screen and that indicates the opponent character. For example, different images may be associated with different ranges of the relative distance d. According to an exemplary embodiment, different images may be associated with the ranges $d_0 < d \leq d_4$ and $d=d_0$. Therefore, according to some exemplary embodiments, the image of the opponent character displayed on the game part screen may be different in accordance with the relative distance d. For example, an image "pic001" may be an image that represents the opponent character directed to an opposite direction (such as the rightward direction on the game part screen) from the moving object on the game part screen. In contrast, an image "pic002" may be an image that represents the opponent character directed to the direction of the moving object (such as the leftward direction on the game part screen) on the game part screen. The images "pic001" and "pic002" may be identical images that are only different in direction, or may be different images regardless of the direction. Therefore, according to an exemplary embodiment, the image of the opponent character may be switched in accordance with the relative distance d.

Turning again to FIG. 1, the server control unit 15 (see FIG. 1) may be a central processing unit (CPU) that realizes a specific function by loading a specific program, for example. The server control unit 15 may control the entire operation of the server apparatus 11. For example, the server control unit 15 may store, in the server storage unit 14, information regarding a user and information regarding a game part (see FIGS. 2 to 5).

According to an exemplary embodiment, when the server communication unit 13 obtains a request from the terminal apparatus 12 for starting a match game part, the server control unit 15 may transmit, from the server communication unit 13 to the terminal apparatus 12, a match game part start instruction including information regarding the user of the terminal apparatus 12 and information regarding a game part according to the request. As will be described later, information regarding the user and information regarding the game part may be used by the terminal apparatus 12 when the terminal apparatus 12 executes the match game part.

According to an exemplary embodiment, when the server communication unit 13 obtains from the terminal apparatus 12, which has executed the match game part, information that indicates the result of playing the match game part (the result of the match), the server control unit 15 may update, on the basis of this information, the information regarding the user. As will be described later, information that indicates the result of the match may include, for example, whether the user wins or loses, a score in accordance with the details of playing the match game part, a game content given as a reward to the user, and parameters (such as the level, HP, and attack ability) of a character included in the deck. For example, the server control unit 15 may update parameters of a character included in information regarding a first game content, out of the information regarding the user, on the basis of information that indicates the result of the match.

Next, the terminal apparatus 12 will be described. According to an exemplary embodiment, the terminal apparatus 12 may include a terminal communication unit 17, a terminal storage unit 18, a display unit 19, an input unit 20, and a terminal control unit 21.

The terminal communication unit 17 may be an interface for communicating wirelessly or via wire with an external apparatus and exchanging information. According to an exemplary embodiment, the terminal communication unit 17 may exchange information with the server apparatus 11 via the network 16.

The terminal storage unit 18 may store various types of information and programs necessary for processing a game provided by the server apparatus 11. For example, the terminal storage unit 18 may store information included in the match game part start instruction, which may be received by the terminal communication unit 17 from the server apparatus 11, such as the information regarding the user and the information regarding the game part.

The display unit 19 may be a display device such as a liquid crystal display or an organic electroluminescence (EL) display. The display unit 19 may display various game screens according to a game provided by the server apparatus 11.

The input unit 20 may be an input interface that may include, for example, a touchscreen integrated with the display unit 19, and that may accept a user input performed on the terminal apparatus 12.

According to an exemplary embodiment, the terminal control unit 21 may be a CPU that may realize a specific function by loading a specific program, and may control the entire operation of the terminal apparatus 12. For example, the terminal control unit 21 may activate a game application in response to a user input accepted by the input unit 20. When the terminal communication unit 17 receives an instruction to display various game screens from the server apparatus 11, the terminal control unit 21 may display a game screen on the display unit 19 or may update the game screen on the basis of the instruction. The terminal control unit 21 may transmit, from the terminal communication unit 17 to the server apparatus 11, information based on a user input accepted by the input unit 20.

To give an example of the function of the terminal control unit 21, the terminal control unit 21 may identify a match game part selected on the basis of a user input accepted by the input unit 20, on a certain game screen that displays one or more match game parts to be selectable. Next, the terminal control unit 21 may transmit a request for starting the selected match game part from the terminal communication unit 17 to the server apparatus 11. The request for starting the match game part may include, for example, the game part ID of the selected match game part.

Next, in response to the match game part start request, when the terminal communication unit 17 receives a match game part start instruction from the server apparatus 11, the terminal control unit 21 may store, in the terminal storage unit 18, information regarding the user and information regarding the game part, which may be included in the instruction.

Next, the terminal control unit 21 may start a match between the user's character(s) included in the deck and the opponent character. Specifically, the terminal control unit 21 may display a game part screen on the display unit 19 and may start a match process. The game part screen and the match process will be described in detail later.

When the match process ends, the terminal control unit 21 may determine the result of the match. Specifically, when the total HP of the user's character(s) included in the deck decreases to a certain target value (second target value), such as zero, in the match process, or when the HP of the opponent character does not decrease to the second target value within a certain limit time, the terminal control unit 21 may determine that the user loses. In contrast, when the HP of the opponent character becomes the second target value, the terminal control unit 21 may determine that the user wins. The terminal control unit 21 may transmit information that indicates the result of the match from the terminal communication unit 17 to the server apparatus 11. As has been described above, information that indicates the result of the match may include, for example, whether the user wins or loses, a score in accordance with the details of playing the match game part, a game content given as a reward to the user, and parameters (such as the level, HP, and attack ability) of a character included in the deck.

Next, the match process executed by the terminal control unit 21 will be described in detail. According to an exemplary embodiment, when the match process is executed, a match game part, which is a horizontal-scrolling action game in the present embodiment, may be executed.

At first, the terminal control unit 21 may start accepting a user input performed on a later-described game part screen. In response to the user input, the terminal control unit 21 may cause, for example, a moving object displayed on the game part screen to take a certain action, such as jumping.

Next, the terminal control unit 21 may automatically change the relative distance d to be closer to a certain target value (first target value) at a certain time change rate. Specifically, the terminal control unit 21 may automatically move at least one of the moving object and the opponent character arranged in virtual space so as to make the relative distance d closer to the first target value. The time change rate of the relative distance d may correspond to the relative speed of the moving object with respect to the opponent character. According to an exemplary embodiment, the first target value do may be zero ($d_{0=0}$), and the initial value of the relative distance d may be $d_2$ (see FIG. 5). The terminal control unit 21 may automatically decrease the relative distance d to be closer to do. In this case, the time change rate of the relative distance d may be defined in accordance with the number of consecutive achievements of a first task (fourth parameter).

According to an exemplary embodiment, when the moving object obtains an acceleration item arranged in the virtual space, the terminal control unit 21 may temporarily increase or decrease the time change rate of the relative distance d. For example, when the moving object and an item, such as an attack item, contact each other, the terminal control unit 21 may determine that the moving object has obtained the attack item. Skills may also be used to affect the time change rate of the relative distance d; according to an exemplary embodiment, when a particular skill assigned to a character included in the deck is used, the terminal control unit 21 may temporarily increase or decrease the time change rate of the relative distance d.

Next, the terminal control unit 21 may switch information regarding a second game content in accordance with the relative distance d. For example, when the relative distance d changes from the range $d_3<d \leq d_4$ to the range $d_1<d \leq d_3$, the terminal control unit 21 may switch, for example based on information regarding a second game content illustrated in FIG. 6, the attack ability of the opponent character from "10" to "50".

Next, the terminal control unit 21 may switch information regarding a stage in accordance with the relative distance d. For example, when the relative distance d changes from the range $d_0<d \leq d_1$ to the range $d=d_0$, the terminal control unit 21 may switch, based on information regarding a stage such as is illustrated in FIG. 4, the stage configuration from "A" to "B".

Next, the terminal control unit 21 may determine whether the first task is achieved. The first task may be an arbitrary task to be achieved by the user in the game. In the present embodiment, the first task may be to obtain all of a series of attack items, which may be scrolled from right to left on the game part screen, as will be described later, using the moving object, which may take a certain action in accordance with a user input. In this case, when the moving object and an attack item contact each other, the terminal control unit 21 may determine that the moving object has obtained the attack item. When the moving object obtains all of a series of attack items, the terminal control unit 21 may then determine that the first task is achieved. In contrast, when the moving object obtains only some of a series of attack items or when the moving object does not obtain any of a series of attack items, the terminal control unit 21 may determine that the first task is not achieved.

When the first task has been achieved, the terminal control unit 21 may increment the number of consecutive achievements (fourth parameter). Thus, the number of consecutive achievements may indicate the number of times the first task is achieved. In this case, the number of consecutive achievements may be used to determine the time change rate of the relative distance d, and the amount of change in the HP of the opponent character as a result of an attack made by the user's character included in the deck. Specifically, a greater number of consecutive achievements may result in a greater time change rate of the relative distance d, and may result in a greater amount of change in the HP of the opponent character.

Next, the terminal control unit 21 may determine whether a second task is successfully achieved. The second task may be an arbitrary task to be achieved by the user in the game. According to an exemplary embodiment, the second task may be to avoid contact between a moving object which takes a certain action in accordance with a user input, and an obstacle that scrolls from right to left on the game part screen, as will be described later. When the moving object does not contact an obstacle, the terminal control unit 21 may determine that the second task is achieved. In contrast, when the moving object contacts an obstacle, the terminal control unit 21 may determine that the second task is not achieved.

When the second task is not achieved, the terminal control unit 21 may change (increase) the relative distance d so as to be away from the first target value do. According to an exemplary embodiment, the amount of change in the relative distance d may be arbitrarily determined. For example, according to one exemplary embodiment, the terminal control unit 21 may change the relative distance d only by a certain value. Alternatively, the terminal control unit 21 may change the relative distance d so as to belong to, among a plurality of non-overlapping numerical ranges, another range (such as $d_1<d \leq d_3$) different from the range (such as $d_0 \leq d \leq d_1$) to which the relative distance d belongs immediately before the second task is not achieved.

If the second task is not achieved, the terminal control unit 21 may decrease the number of consecutive achievements. According to an exemplary embodiment, the amount of decrease in the number of consecutive achievements may be arbitrarily determined. For example, according to one exemplary embodiment, the terminal control unit 21 may decrease the number of consecutive achievements to half (rounded up).

Next, the terminal control unit 21 may determine whether to execute an attack made by at least one of a user's character included in the deck and the opponent character. According to an exemplary embodiment, when the moving object obtains a certain number of attack items arranged on the course, the terminal control unit 21 may determine to execute an attack made by the user's character. When a certain time elapses in accordance with the operation format of the opponent character, for example, the terminal control unit 21 may determine to execute an attack made by the opponent character.

According to an exemplary embodiment, to execute an attack made by the user's character or the opponent character, the terminal control unit 21 may decrease the total HP of the user's character(s) or the HP of the opponent character. For example, to execute an attack made by the user's character, the terminal control unit 21 may determine the amount of decrease in the HP of the opponent character on the basis of the attack ability of the user's character, and the change parameter α determined in accordance with the relative distance d.

Next, the terminal control unit 21 may determine whether the total HP of the user's character(s) or the HP of the opponent character has reached a certain target value (second target value). According to an exemplary embodiment, this second target value may be zero. When the total HP of the user's character(s) or the HP of the opponent character reaches the second target value, the match process may end. According to an exemplary embodiment, when the total HP of the user's character(s) or the HP of the opponent character has not yet reached the second target value, the above-described match process may be repeatedly executed until a certain limit time elapses.

Next, referring to FIGS. 7 to 9, a game part screen displayed on the display unit 19 of the terminal apparatus 12 will be described.

FIG. 7 illustrates an exemplary embodiment of a game part screen 22 immediately after the start of the match game part. In this embodiment, the relative distance d may be $d_2$ ($d=d_2$) immediately after the start of the match game part. The game part screen 22 may include a limit time image 23, a moving object image 24, an opponent character image 25, a first HP image 26, a second HP image 27, a deck display area 28, a course image 29, an attack item image 30, and a change parameter image 31. According to an exemplary embodiment, the course image 29 and the attack item image 30 may automatically change their positions on the screen as the screen scrolls in a first direction. The first direction may be a direction parallel to the screen; according to an exemplary embodiment, the screen may scroll from right to left (leftward direction). For example, the course image 29 and the attack item image 30 may move as if they drift from right to left on the screen. By scrolling the screen in the first direction, the relative distance d may be automatically decreased, which may cause the moving object to automatically move toward the opponent character in the virtual space, as described above.

The limit time image 23 may be an image that represents a limit time left until the match game part ends.

The moving object image 24 may be an image that represents a moving object operated in accordance with a user input of a user who plays first on the terminal apparatus 12. For example, when the user taps an arbitrary position on the screen, the moving object may jump upward on the screen.

The opponent character image 25 may be an image that represents the opponent character. Referring to FIG. 7, the relative distance d may be $d_2$ ($d=d_2$), and a first image, "pic001" (such as the image of the opponent character directed rightward on the screen) may be displayed as the opponent character image 25 (see FIG. 6). A display parameter that defines the display format of the opponent character image 25 on the game part screen 22 may be determined in accordance with the relative distance d. The display parameter includes at least one of the size (display size), brightness, and saturation of the image on the screen. However, the display parameter is not limited to these parameters, and may include various parameters defining the display format of the image. For example, the distance between the moving object and the opponent character in the virtual space may be represented by changing at least one of the size, brightness, and saturation of the opponent character image 25 in accordance with the relative distance d. For example, according to an exemplary embodiment, as the relative distance d is increased, the size of the opponent character image 25 may be decreased. According to another exemplary embodiment, a greater relative distance d may brighten or darken the brightness of the opponent character image 25. According to another exemplary embodiment, a greater relative distance d may lower the saturation of the opponent character image 25. In this manner, the fact that the moving object and the opponent character are becoming further apart in the depth direction (second direction) of the screen may be represented.

The first HP image 26 may be an image that represents the total HP of the user's character(s) included in the deck, and the second HP image 27 may be an image that represents the HP of the opponent character. For example, the first HP image 26 and the second HP image 27 may be bars or other indicators, and the length of each indicator may become shorter as the HP decreases.

The deck display area 28 may be an area where an image that represents the user's character(s) included in the deck is displayed. The image of each character may also function as an interface that accepts a user input. According to an exemplary embodiment, when the user taps the image of a character, a skill associated with the character may be activated. In response to the activation of the skill, various effects may occur, such as the occurrence of damage to the opponent character or a decrease in the amount of damage caused by the opponent character.

The course image 29 may be an image that represents the footing of the moving object. According to an exemplary embodiment, the moving object may be able to travel on the course. The user may operate the moving object so that the moving object does not fall downward from the course on the screen.

The attack item image 30 may be an image that represents an attack item necessary for a character included in the deck to attack the opponent character. For example, according to an exemplary embodiment, when the moving object has obtained a certain number of attack items, a character included in the deck may attack the opponent character. Referring to FIG. 7, eight attack items that are closely arranged to one another may correspond to the above-described series of attack items. When the moving object obtains all of the eight attack items, that is, when the first task is achieved, the number of consecutive achievements may increase. The user may operate the moving object so that the moving object obtains attack items on the screen.

The change parameter image 31 may be an image that represents the change parameter α defined in accordance with the relative distance d. Referring to FIG. 7, according to an exemplary embodiment, the change parameter image 31 may illustrate that the change parameter α is 0.2 (α=0.2 (20%)), and the amount of damage to the opponent character may correspondingly decrease to 20%. According to an exemplary embodiment, the change parameter image 31 may be displayed when the user's character makes an attack; according to an alternative exemplary embodiment, the change parameter image 31 may be displayed at all times at an arbitrary position on the screen.

According to an exemplary embodiment, the above-described game part screen 22 may be incorporated into a game that represents the movement of the moving object in terms of scrolling in the first direction of the screen, as will be described later.

According to an exemplary embodiment of a general game where the screen scrolls, only the virtual space surrounding a moving object operated by a user may be displayed on the screen. Therefore, an object (such as an opponent character) arranged relatively far away from the moving object may not be displayed on the screen unless the screen scrolls a certain amount. According to an exemplary embodiment of a general game, the opponent character may not be displayed on the screen until the moving object comes sufficiently close to the opponent character.

In contrast, an exemplary embodiment of the game part screen 22 may represent the movement of the moving object in terms of scrolling in the first direction of the screen, and may at the same time display the opponent character image 25, which is distant in the depth direction of the screen, by using the display parameter in accordance with the relative distance d. According to such an exemplary embodiment, the opponent charter, which is arranged at a relatively distant place from the moving object in the virtual space, may be displayed on the screen, and at the same time, the user can be caused to recognize the positional relationship between the moving object and the opponent character.

According to an exemplary embodiment, a user may be able to recognize, from the game part screen 22, the positional relationship between the moving object and the opponent character in the virtual space on the basis of the relative distance d. The processing load on the terminal apparatus 12 may be decreased, compared with an exemplary configuration that arranges a moving object and an opponent character in three-dimensional virtual space, and displays the three-dimensional virtual space to cause the user to recognize the positional relationship between the moving object and the opponent character.

Figure 8:
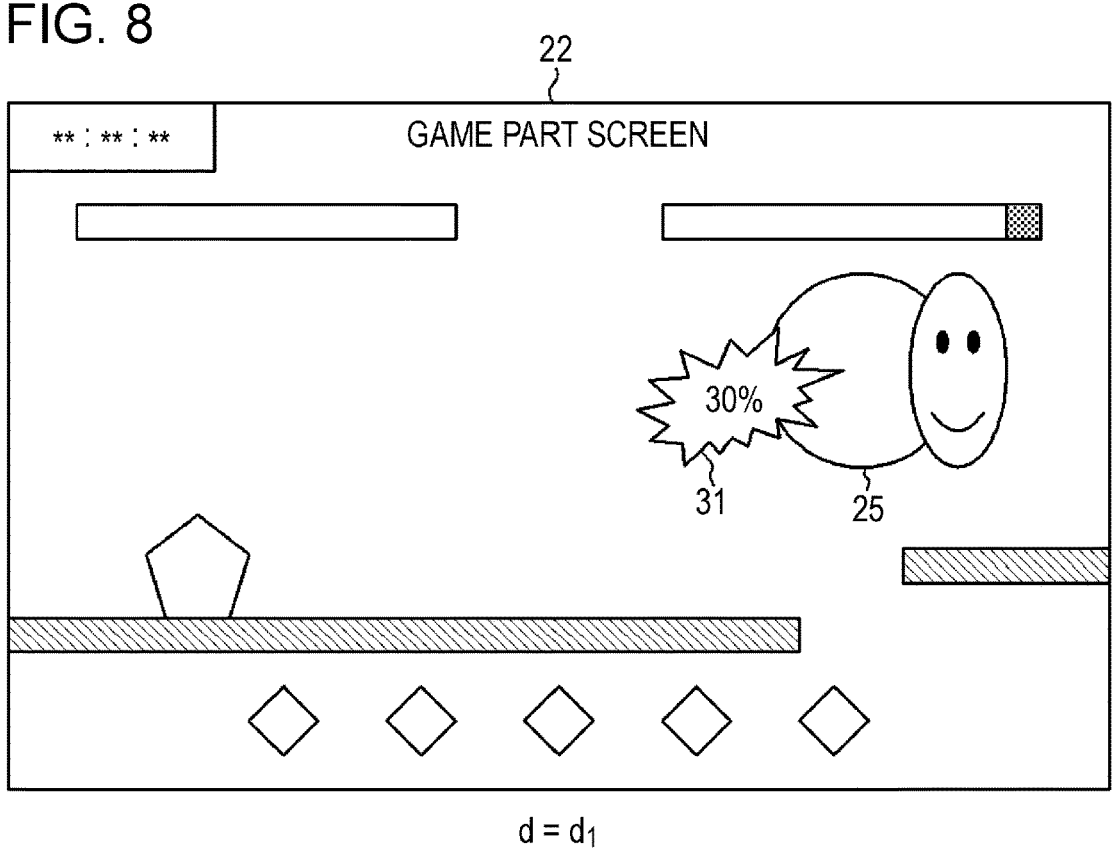
FIG. 8 is a diagram illustrating a game screen according to the embodiment.

Turning now to exemplary FIG. 8, FIG. 8 illustrates an exemplary game part screen 22 after the match game part has progressed and the relative distance d has become $d_1$ (d=$d_1$ (<$d_2$)). Referring to FIG. 8, the opponent character image 25 may be displayed larger than that in FIG. 7 where the relative distance d is $d_2$ (d=$d_2$). In addition, the change parameter image 31 may illustrate that the change parameter α is 0.3 (α=0.3 (30%)), and the amount of damage to the opponent character may correspondingly decrease to 30%.

Figure 9:
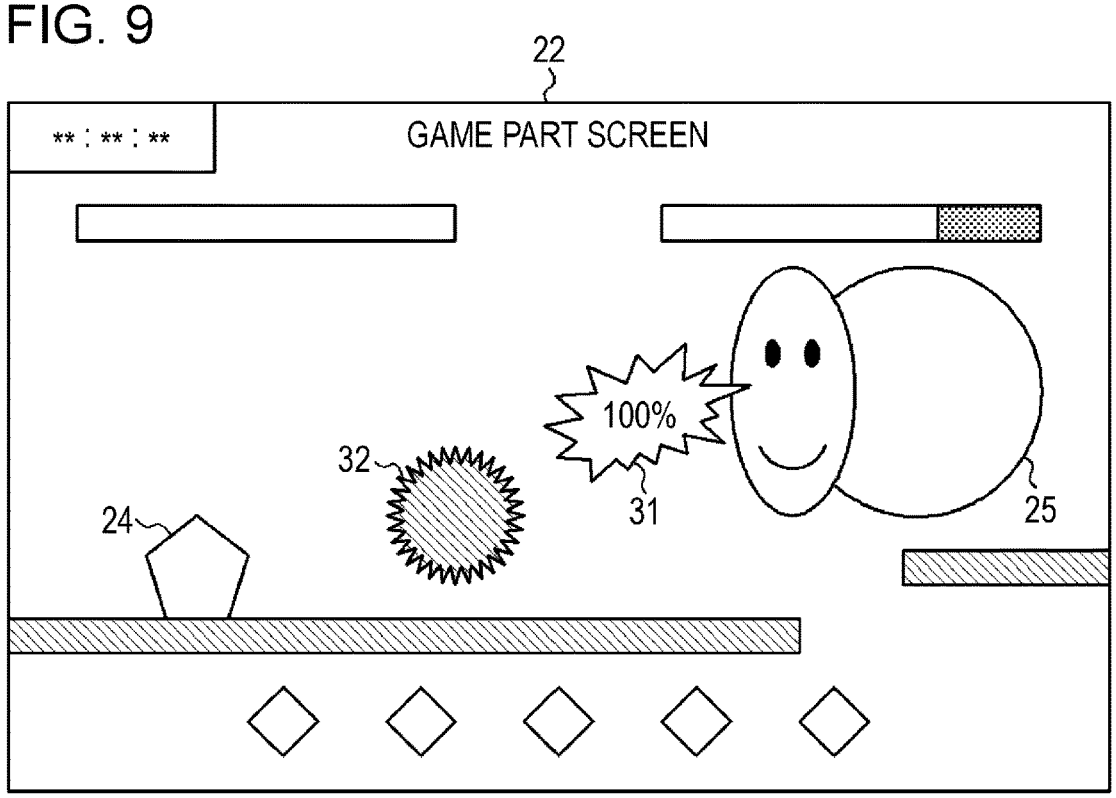
FIG. 9 is a diagram illustrating a game screen according to the embodiment.

FIG. 9 illustrates an exemplary game part screen 22 in the case where the match game part has further progressed and the relative distance d has become do (d=$d_0$ (first target value)). Referring to FIG. 9, the relative distance d may be do (d=$d_0$), and the opponent character image 25 may be switched; for example, the opponent character image 25 may be switched to "pic002" (such as the image of the opponent character directed leftward on the screen) (see FIG. 6). In addition, the change parameter image 31 may illustrate that the change parameter α is 1.0 (α=1.0 (100%)), and the amount of damage to the opponent character may accordingly not decrease.

Referring again to FIG. 9, the game part screen 22 may include an obstacle image 32. The obstacle image 32 may be an image that represents an obstacle. According to an exemplary embodiment, the obstacle image 32 may move as if it drifts from right to left on the screen, like the course image 29 and the attack item image 30 illustrated in FIG. 7. According to an exemplary embodiment, when the moving object and the obstacle image 32 contact each other, that is, when the second task is not achieved, the relative distance d may increase, and the number of consecutive achievements may decrease.

Figure 10:
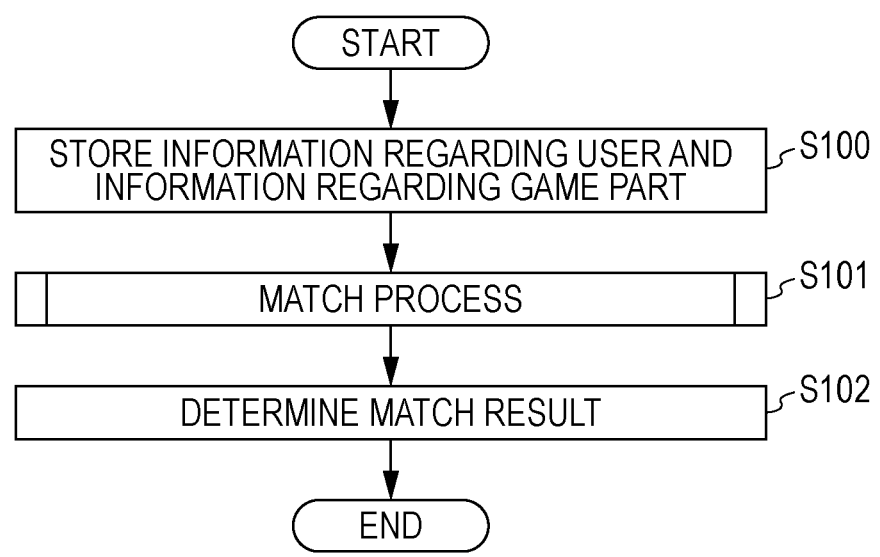
FIG. 10 is a flowchart illustrating a process performed by the terminal apparatus.

Next, referring to the flowchart illustrated in FIG. 10, the operation of an exemplary embodiment of the terminal apparatus 12 which executes a match game part will be described. According to an exemplary embodiment, this operation may start after the terminal apparatus 12 transmits a request for starting a match game part to the server apparatus 11.

In Step S100, the terminal communication unit 17 may first receive from the server apparatus 11 an instruction for starting a match game part. The terminal control unit 21 may then store, in the terminal storage unit 18, information regarding a user and information regarding a game part, which are included in the instruction.

In Step S101, next, the terminal control unit 21 may display a game part screen on the display unit 19, and may start a match process.

In Step S102, when the match process in step S101 ends, the terminal control unit 21 may determine the result of the match, and may transmit information indicating the result of the match from the terminal communication unit 17 to the server apparatus 11. According to an exemplary embodiment, the terminal control unit 21 may determine that the user loses when the total HP of the user's character(s) included in the deck decreases to the second target value (zero) in the match process. In contrast, the terminal control unit 21 may determine that the user wins when the HP of the opponent character decreases to the second target value in the match process.

Figure 11:
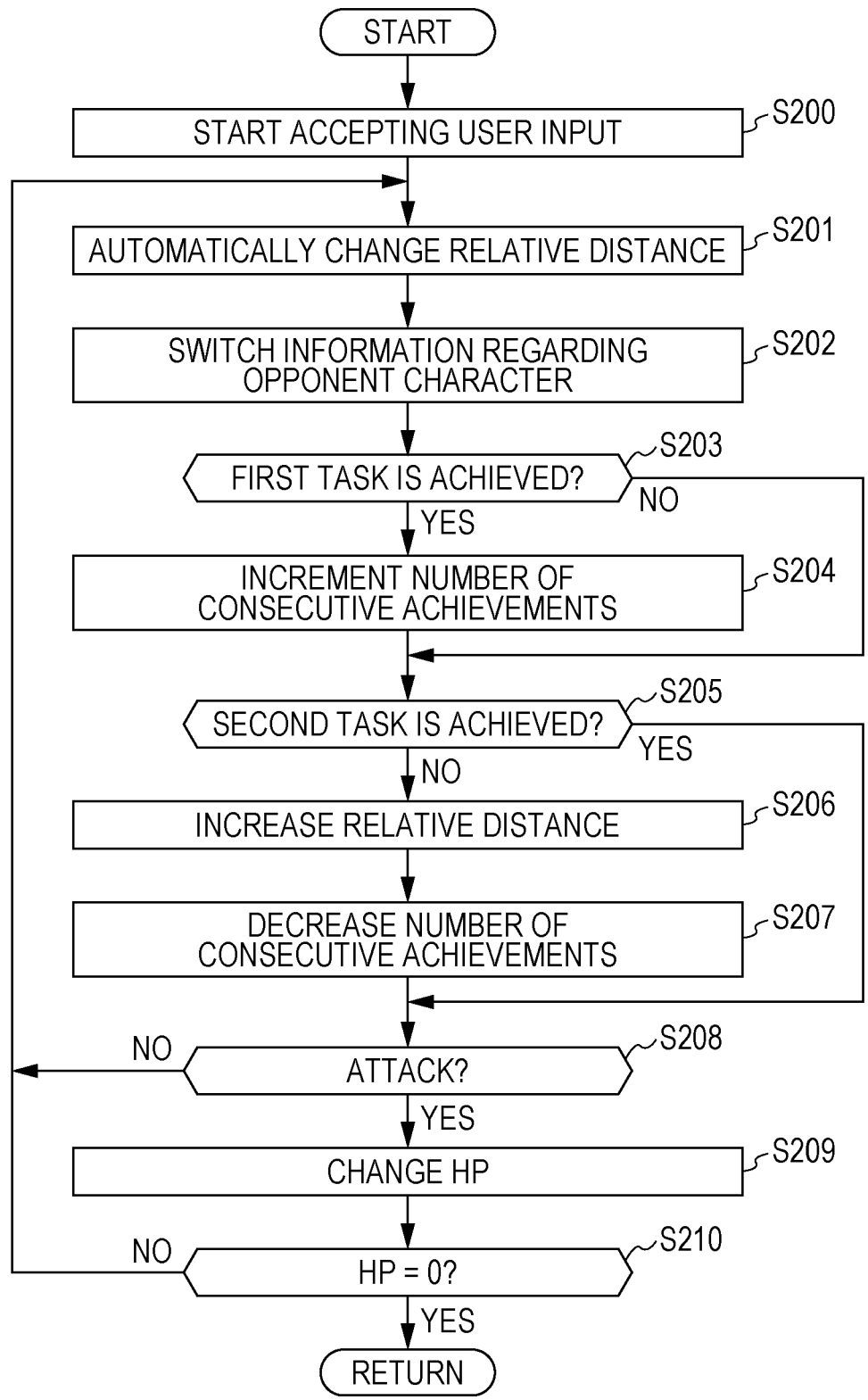
FIG. 11 is a flowchart illustrating a match process illustrated in FIG. 10.

Next, referring to the flowchart illustrated in FIG. 11, the operation of an exemplary embodiment of the terminal apparatus 12 which executes a match process will be described. This operation may be executed in step S101 described above (see FIG. 10).

In Step S200, first, the terminal control unit 21 may start accepting a user input performed on a later-described game part screen.

In Step S201, next, the terminal control unit 21 may automatically change the relative distance d to be closer to the first target value ($d_0$) at a certain time change rate.

In Step S202, next, the terminal control unit 21 may switch information regarding a second game content in accordance with the relative distance d. The terminal control unit 21 may also switch information regarding a stage in accordance with the relative distance d.

In Step S203, next, the terminal control unit 21 may determine whether the first task is or has been achieved. When the first task is achieved (YES in step S203), the operation may proceed to step S204. In contrast, when the first task has not been achieved (NO in step S203), the operation may proceed to step S205.

In Step S204, when the first task is achieved in step S203 (YES in step S203), the terminal control unit 21 may increment the number of consecutive achievements.

In Step S205, after step S204, or when the first task is not achieved in step S203 (NO in step S203), the terminal control unit 21 may determine whether the second task is achieved. When the second task is achieved (YES in step S205), the operation may proceed to step S208. In contrast, when the second task has not been achieved (NO in step S205), the operation may proceed to step S206.

In Step S206, when the second task has not been achieved in step S205 (NO in step S205), the terminal control unit 21 may change (increase) the relative distance d so as to be away from the first target value do.

In Step S207, next, the terminal control unit 21 may decrease the number of consecutive achievements.

In Step S208, after step S207, or when the second task is achieved in step S205 (YES in step S205), the terminal control unit 21 may determine whether to execute an attack made by at least one of the user's character included in the deck and the opponent character. To execute an attack (YES in step S208), the operation may proceed to step S209. In contrast, when the terminal control unit 21 determines not to execute an attack (NO in step S208), according to an exemplary embodiment, the operation may return to step S201 until when a certain limit time elapses.

In Step S209, to execute an attack in step S208 (YES in step S208), the terminal control unit 21 may decrease the total HP of the user's character(s) or the HP of the opponent character. To execute an attack made by the user's character, the terminal control unit 21 may determine the amount of decrease in the HP of the opponent character on the basis of the attack ability of the user's character, and the change parameter α determined in accordance with the relative distance d.

In Step S210, next, the terminal control unit 21 may determine whether the total HP of the user's character(s) or the HP of the opponent character has reached the second target value (for example, zero). When the total HP of the user's character(s) or the HP of the opponent character reaches the second target value (YES in step S210), the match process may end, and the operation may proceed to step S102 described above (see FIG. 10). In contrast, when the total HP of the user's character(s) or the HP of the opponent character has not reached the second target value (NO in step S210), the operation may return to step S201 until when the certain limit time elapses.

According to an exemplary embodiment, the terminal apparatus 12 may automatically change the relative distance d to be closer to the first target value ($d_0$) at a certain time change rate, and, when the user's character included in the deck makes an attack, the HP of the opponent character may be changed on the basis of the relative distance d. According to such an embodiment, damage caused to the opponent character as a result of an attack made by the user's character may change in accordance with the relative distance d. This may help prevent the game from becoming monotonous, and may allow the game to undergo changes in its development in accordance with the progress of the game.

According to an exemplary embodiment, when the relative distance d is equal to the first target value ($d_0$) (as illustrated in FIG. 5, for example), the change parameter α may become the maximum ($α_2$), and the amount of change in the HP of the opponent character as a result of an attack made by the user's character may also become the greatest. Therefore, according to an exemplary embodiment, when the relative distance d is equal to the first target value, the HP of the opponent character can be more effectively changed than in other cases. Accordingly, the game may become more entertaining in circumstances where the relative distance d is equal to the first target value. Because the user is motivated to maintain the relative distance d at the first target value, the user may experience more tension in their gameplay, thereby making the game more entertaining.

According to an exemplary embodiment, as the relative distance d becomes closer to the first target value ($d_0$) (as illustrated in FIG. 5, for example), the change parameter α may increase, and the amount of change in the HP of the opponent character as a result of an attack made by the user's character may also increase. Therefore, as the relative distance d becomes closer to the first target value, the HP of the opponent character can be more effectively changed than in other cases. Accordingly, the game may become even more entertaining. Because the amount of change in the HP of the opponent character may increase in accordance with the relative distance d, the user can be caused to recognize changes in the relative distance d.

According to an exemplary embodiment, as illustrated in FIG. 6, information regarding a second game content may be switched in accordance with the relative distance d. In such an embodiment, at least one of the operation format and image of the opponent character may change in accordance with the relative distance d in this manner. This may further prevent the game from becoming monotonous, and allow the development of the game to change in accordance with the progress of the game. Because at least one of the operation format and image of the opponent character may change in accordance with the relative distance d, the user can be caused to recognize changes in the relative distance d.

According to an exemplary embodiment, the HP of the opponent character may be changed on the basis of the number of consecutive achievements, which may increase when the first task is achieved. According to such an embodiment, because damage caused to the opponent character as a result of an attack made by the user's character may change in accordance with the number of consecutive achievements, this may allow the development of the game to change in accordance with the progress of the game.

According to an exemplary embodiment, the time change rate of the relative distance d may be defined in accordance with the number of consecutive achievements. This may, for example, increase the user's interest in the game, because the user is prompted to achieve the first task by motivating the user to increase the number of consecutive achievements.

According to an exemplary embodiment, when the second task is not achieved, the relative distance d may be changed so as to be away from the first target value ($d_0$). This may motivate the user to achieve the second task in this manner, and may increase the user's interest in the game.

Although the present invention has been described on the basis of the drawings and the embodiments, it should be noted that various modifications or changes can be made by those skilled in the art on the basis of the present disclosure. Therefore, it should be noted that these modifications or changes fall within the scope of the present invention. For example, the functions included in each unit or each step may be relocated to the extent that relocating them would not be logically inconsistent with other functions. A plurality of units or steps can also be combined as one unit or step, or one unit or step can be separated into a plurality of units or steps.

For example, according to an exemplary embodiment, the server apparatus 11 and the terminal apparatus 12 may store information that indicates the corresponding relationship between the attribute of the user's character and the relative distance d in the above-described embodiment, and, if an attribute corresponding to the relative distance d has a certain corresponding relationship with the attribute of the user's character during the progress of a match game part, such as if the two attributes are identical, the amount of change in the HP of the opponent character as a result of an attack made by the user's character may be increased. For example, according to one exemplary embodiment, the server apparatus 11 and the terminal apparatus 12 may store information that associates a long-ranged type to $d_3 < d \le d_4$, a mid-ranged type to $d_1 < d \le d_3$, and a short-ranged type to $d_0 \le d \le d_1$. During the progress of a match game part, for a character associated with the long-ranged type attribute, when the relative distance d satisfies $d_3 < d \le d_4$, the amount of change in the HP of the opponent character as a result of an attack made by the character may become greater than it would be for a character not associated with the long-ranged type attribute. According to an exemplary embodiment, since the relative distance d which is advantageous for each character may vary as described above, deck generation may become more strategic. For example, a user may be motivated to maintain the relative distance d advantageous for a character included in the deck, which may cause the match game part to become more strategic; for example, a user may elect to intentionally fail in achieving the second task in order to maintain the advantageous relative distance d.

Although previous exemplary embodiments have discussed the configuration of changing the amount of change in the HP of the opponent character as a result of an attack made by the user's character in accordance with the relative distance d, other parameters may be changed in accordance with the relative distance d. For example, according to an exemplary embodiment, an attack success rate of the user's character (such as the attack accuracy rate) may change in accordance with the relative distance d. For example, a greater relative distance d may give the user's character a lower attack success rate.

Although previous exemplary embodiments have discussed the configuration of switching information regarding a second game content, such as the operation format or image of the opponent character, in accordance with the relative distance d, various types of information regarding the opponent character may be switched. For example, according to an exemplary embodiment, the configuration may switch the image of the opponent character to a gigantic image when the relative distance d becomes equal to a certain value, such as the first target value ($d_0$). According to an exemplary embodiment, a gigantic opponent character image may be divided into a plurality of portions, each of which is associated with the HP.

Figure 12:
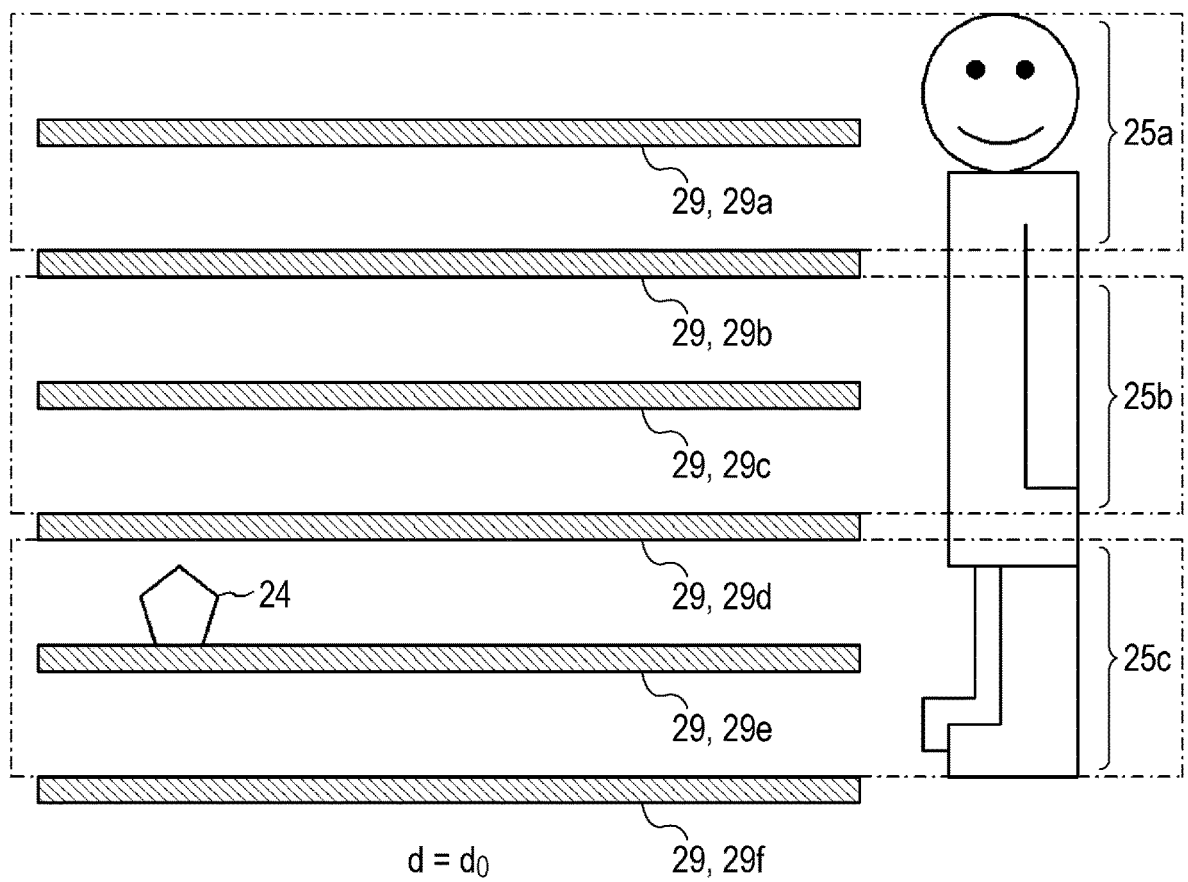
FIG. 12 is a diagram illustrating a game screen according to a modification of the embodiment.

For example, as illustrated in FIG. 12, an exemplary embodiment of the opponent character image 25 may include a plurality of portions, such as a head 25a, a body 25b, and feet 25c. According to such an embodiment, if the moving object is on a course image 29a or 29b, the HP of the head 25a may change as a result of an attack made by a character included in the deck. If the moving object is on a course image 29c or 29d, the HP of the body 25b may change as a result of an attack made by a character included in the deck. If the moving object is on a course image 29e or 29f, the HP of the feet 25c may change as a result of an attack made by a character included in the deck. According to an exemplary embodiment, it may be defined that the user wins when all the HPs associated with the plurality of portions decrease to the second target value (for example, zero).

In the above configuration, the corresponding relationship between the relative distance d and the change parameter α, which may be different for the individual portions of the opponent character, may be set. For example, according to an exemplary embodiment, the change parameter α may become the maximum when the relative distance d is 10 (d=10) for the head 25a; the change parameter α may become the maximum when the relative distance d is 5 (d=5) for the body 25b; and the change parameter α may become the maximum when the relative distance d is 3 (d=3) for the feet 25c.

Although previous exemplary embodiments have discussed the configuration where the moving object moves to be closer to the opponent character in the virtual space, the movement format of the moving object and the opponent character may not be limited to the above. For example, according to an exemplary embodiment, the configuration may be such that the moving object moves to be away from (flee from) the opponent character, or the opponent character moves to be closer to the moving object. In such an exemplary embodiment, the first target value may be set to the maximum value that the relative distance d may take, for example. Other variations may also be understood; for example, as in a previous exemplary embodiment, information regarding a second game content, such as the operation format or image of the opponent character, may be switched in accordance with the relative distance d.

Although previous exemplary embodiments have described that the match game part is a single-player game part, according to an exemplary embodiment, the match game part may be a multiple-player game part in which multiple users play a match with a common opponent character. In one exemplary embodiment, the preferential rating of each user defined as a target to be attacked by the opponent character may be determined on the basis of the relative distance d between each user's moving object and the opponent character in the virtual space. For example, when the opponent character makes an attack, a user with a short relative distance d may be determined as a target to be attacked by the opponent character. This may make the game more strategic; for example, by having some users preferentially receive attacks made by the opponent character, other users may be protected.

Although previous exemplary embodiments have discussed the configuration where the number of consecutive achievements is incremented when the first task is achieved and is decreased when the second task is not achieved, according to an exemplary embodiment, the first task and the second task may be defined based on the genre or details of the game. For example, according to one exemplary embodiment, a puzzle game for deleting objects may define the first task as deleting an object and the second task as deleting the next object within a certain time.

Alternatively, a fighting game for characters to battle each other may define the first task as making an attack that accurately hits the opponent character, and the second task as making the next attack that accurately hits the opponent character within a certain time. Alternatively, a first person shooter (FPS) game for repelling an opponent character using a weapon such as a gun may define the first task as accurately shooting an opponent character, and the second task as shooting the next opponent character within a certain time without reloading the gun.

According to an exemplary embodiment, the first task and the second task may be an identical task. For example, according to an exemplary embodiment wherein the game is a quiz game for sequentially answering a plurality of questions, the first task and the second task may be defined as correctly answering each question within a certain time.

Although previous embodiments have discussed the configuration in which the first game content owned by the user is different from the moving object arranged in the virtual space, the configuration may be such that the first game content may be used as the moving object. In this case, the third parameter may be a parameter regarding the positional relationship between the first game content, which is the moving object, and the second game content in the virtual space. Specifically, the third parameter may be the relative distance d indicating the distance between the first game content and the second game content.

According to an exemplary embodiment, the game may be a native game in which the processing performed by the server apparatus 11 is partially or entirely executed by a native application installed in the terminal apparatus 12.

According to an exemplary embodiment, various game screens may be partially displayed via a web display on the terminal apparatus 12 on the basis of data generated by the server apparatus 11, and part (such as a header area and a footer area where menu buttons are located) of each game screen may be displayed via a native display by a native application installed in the terminal apparatus 12. According to such an exemplary embodiment, the game may be a hybrid game where the server apparatus 11 and the terminal apparatus 12 each perform part of the processing.

According to an exemplary embodiment, an information processing apparatus such as a computer or a cellular phone may be suitably used to function as the server apparatus 11 or the terminal apparatus 12. Such an information processing apparatus can be realized by storing, in a storage unit of the information processing apparatus, a program that describes the details of processing for realizing each function of the server apparatus 11 or the terminal apparatus 12 according to the embodiment, and reading and executing the program with the use of a CPU of the information processing apparatus.

What is claimed is:

1. A non-transitory computer-readable medium upon which a computer program product is embodied, comprising code executable by a computer arranged to operate a computer game, the computer having at least a processor and a storage unit, to cause the computer to carry out the following steps:
   a storing step, comprising storing, in the storage unit, a first parameter associated with a first game content arranged in virtual space, and a second parameter associated with a second game content arranged in the virtual space, the first parameter corresponding to an attack ability of the first game content, the second parameter corresponding to a received damage value of the second game content;
   a starting step, comprising, with the processor, starting a match between the first game content and the second game content, wherein starting the match comprises defining a third parameter, the third parameter corresponding to a positional relationship between the first game content and the second game content in the virtual space;
   a comparison step, comprising, with the processor, comparing the third parameter to a first target value, and, when there is at least a predetermined difference between the third parameter and the first target value, reducing the value of a change parameter based on the third parameter to a nonzero value based on a result of a comparison between the third parameter and the first target value, wherein the change parameter is adjusted based on a first change rate, said first change rate comprising a slope of a predefined function of variance of the change parameter with respect to the third parameter;
   a changing step, comprising, with the processor, determining that a first task has been executed and changing the second parameter associated with the second game content by an amount, wherein the amount is determined based on an adjustment of the first parameter by the change parameter; and
   a determining step, comprising determining, with the processor, that a user wins the match when the second parameter becomes a second target value.

2. The non-transitory computer-readable medium of claim 1, wherein the comparison step further comprises:
   determining the first target value based on a range attribute of the first game content, the range attribute comprising at least one of the set of: a short range attribute and a long range attribute;
   setting the predetermined difference to a first predetermined difference when the range attribute is the short range attribute and setting the predetermined difference to a second predetermined difference larger than the first predetermined difference when the range attribute is the long range attribute.

3. The non-transitory computer-readable medium of claim 1, wherein the comparison step further comprises:
   comparing the third parameter to a minimum distance value, and, when the third parameter is less than the minimum distance value, reducing the value of a change parameter to a nonzero value based on a result of a comparison between the third parameter and the minimum distance value.

4. The non-transitory computer-readable medium of claim 3, wherein the change parameter is adjusted by the first change rate when there is at least the predetermined difference between the third parameter and the first target value, and wherein the change parameter is adjusted by a second change rate when the third parameter is less than the minimum distance value.

5. The non-transitory computer-readable medium of claim 4, wherein the second change rate is greater than the first change rate.

6. The non-transitory computer-readable medium of claim 1, further comprising:
   automatically adjusting a position of the first game content in a first direction by automatically changing the third parameter to be closer to the first target value at a certain time change rate; and
   receiving a user input, and, in response to the user input, automatically adjusting the position of the first game content in a different direction.

7. The non-transitory computer-readable medium of claim 1, wherein the comparison step further comprises adjusting an operation format from a first operation format associated with a first range of values of the third parameter to a second operation format associated with a second range of values of the third parameter.

8. A system for providing a game, the system comprising:
   a storage unit configured to store a first parameter associated with a first game content arranged in virtual space and a second parameter associated with a second game content arranged in the virtual space, the first parameter corresponding to an attack ability of the first game content, the second parameter corresponding to a received damage value of the second game content; and a control unit comprising a processor, wherein the control unit is configured to:
  start a match between the first game content and the second game content, and define a third parameter, the third parameter corresponding to a positional relationship between the first game content and the second game content in the virtual space;
  compare the third parameter to a first target value, and, when there is at least a predetermined difference between the third parameter and the first target value, reduce the value of a change parameter based on the third parameter to a nonzero value based on a result of a comparison between the third parameter and the first target value, wherein the change parameter is adjusted based on a first change rate, said first change rate comprising a slope of a predefined function of variance of the change parameter with respect to the third parameter;
  determine that a first task has been executed, determine an amount of adjustment to be made to the second parameter based on the first parameter and the change parameter, and change the second parameter associated with the second game content by the amount; and
  determine that a user wins the match when the second parameter becomes a second target value.

9. The system of claim 8, wherein the control unit is further configured to:
  determine the first target value based on a range attribute of the first game content, the range attribute comprising at least one of the set of: a short range attribute and a long range attribute;
  set the predetermined difference to a first predetermined difference when the range attribute is the short range attribute and setting the predetermined difference to a second predetermined difference larger than the first predetermined difference when the range attribute is the long range attribute.

10. The system of claim 8, wherein the control unit is further configured to:
  compare the third parameter to a minimum distance value, and, when the third parameter is less than the minimum distance value, reduce the value of a change parameter to a nonzero value based on a result of a comparison between the third parameter and the minimum distance value.

11. The system of claim 10, wherein the control unit is further configured to adjust the change parameter by the first change rate when there is at least the predetermined difference between the third parameter and the first target value, and adjust the change parameter by a second change rate when the third parameter is less than the minimum distance value.

12. The system of claim 11, wherein the second change rate is greater than the first change rate.

13. The system of claim 8, wherein the control unit is further configured to:
  automatically adjust a position of the first game content in a first direction by automatically changing the third parameter to be closer to the first target value at a certain time change rate; and
  receive a user input, and, in response to the user input, automatically adjust the position of the first game content in a different direction.

14. The system of claim 8, wherein the control unit is further configured to:
  adjust an operation format from a first operation format associated with a first range of values of the third parameter to a second operation format associated with a second range of values of the third parameter.

* * * * *